United States Patent [19]

Matsuda et al.

[11] Patent Number: 6,069,439
[45] Date of Patent: May 30, 2000

[54] PHOSPHOR MATERIAL, METHOD OF MANUFACTURING THE SAME AND DISPLAY DEVICE

[75] Inventors: Naotoshi Matsuda, Chigasaki; Masaaki Tamatani, Fujisawa; Miwa Okumura, Kawasaki; Keiko Albessard, Yokohama, all of Japan

[73] Assignee: Kabushiki Kaisha Toshiba, Kawasaki, Japan

[21] Appl. No.: 09/049,943

[22] Filed: Mar. 30, 1998

[30] Foreign Application Priority Data

Mar. 31, 1997 [JP] Japan .................................. 9-079863

[51] Int. Cl.$^7$ .................................................. H01J 29/10
[52] U.S. Cl. ................................. 313/461; 252/301.4 R; 252/301.6 R; 252/301.6 S; 313/485; 313/487
[58] Field of Search .................................. 313/461, 463, 313/467, 486, 485; 252/301.4 R, 301.6 S, 301.6 R; 428/403, 404

[56] References Cited

U.S. PATENT DOCUMENTS

| | | | |
|---|---|---|---|
| 4,377,769 | 3/1983 | Beatty et al. | 252/301.6 S |
| 4,801,398 | 1/1989 | Ohno et al. | 252/301.4 S |
| 5,126,204 | 6/1992 | Tono et al. | 252/301.6 R |
| 5,200,250 | 4/1993 | Tono et al. | 252/301.6 R |
| 5,518,808 | 5/1996 | Bruno et al. | 252/301.6 R |
| 5,604,396 | 2/1997 | Watanabe et al. | 313/485 |
| 5,667,724 | 9/1997 | Petersen | 252/301.6 S |
| 5,811,924 | 9/1998 | Okumura et al. | 313/487 |
| 5,814,932 | 9/1998 | Matsuda et al. | 313/461 |

OTHER PUBLICATIONS

H. Kominami, et al., "Surface Modification Of Phosphors By Sol–Gel Method", Extended Abstracts of the $2^{nd}$ International Conference on the Science and Technology of Display Phosphors, Nov. 18, 1996, pp. 319–322.

Primary Examiner—Vip Patel
Assistant Examiner—Mariceli Santiago
Attorney, Agent, or Firm—Oblon, Spivak, McClelland, Maier & Neustadt, P.C.

[57] ABSTRACT

A method of manufacturing a phosphor material, which comprises the steps of, generating thermal plasma, supplying a conductive material into the thermal plasma so as to evaporate the conductive material, supplying phosphor particles into the thermal plasma so as to allow the conductive material to adhere onto the surface of the phosphor particles, and cooling the phosphor particles having the conductive material adhered thereon. By making use of this method, it is possible to manufacture a phosphor material comprising a phosphor particle and a conductive layer formed on the surface of the phosphor particle, wherein the ratio between the minor axis and the major axis of the phosphor material is 1.5 or less.

16 Claims, 2 Drawing Sheets

PHOSPHOR MATERIAL, METHOD OF MANUFACTURING THE SAME AND DISPLAY DEVICE

BACKGROUND OF THE INVENTION

This invention relates to a phosphor material, to a method of manufacturing the phosphor material, and also to a display device such as a vacuum fluorescent display and a field emission display.

In an electron beam excited display, emission is deteriorated if the fluorescent screen is charged up, so that electric charges accumulated on the fluorescent screen are required to be discharged. In the case of a cathode ray tube, a conductive film made of, for example, aluminum is formed on the back surface of the fluorescent screen (the surface facing the electron gun) to remove the electric charge. Since electron beam is accelerated to a high speed with an anode voltage of at least 10 kV, e.g., about 30 kV in general, the electron beam can pass through the conductive film to reach the fluorescent screen, whereby exciting phosphor. However, the vacuum fluorescent display and field emission display are designed to excite the phosphor with a low voltage electron beam which is accelerated with an anode voltage of 1 kV or less. Therefore, if a conductive film is formed on the back surface of the fluorescent screen in such a low voltage electron beam excited display, the electron beam is incapable of passing through the conductive film. As a result, the phosphor cannot be sufficiently excited. Accordingly, the conductive film may not be applied to the low voltage electron beam excited display.

In order to overcome the above problem, there has been proposed to employ a phosphor material provided with conductivity for a low voltage electron beam excited display so as to prevent the fluorescent screen from being charged up.

As one example of such an attempt, a phosphor exhibiting conductivity has been developed. For example, green-emitting ZnO:Zn phosphor is electrically conductive. However, a conductive phosphor emitting light other than green and exhibiting sufficient luminance has not been developed as yet. Therefore, it is impossible to manufacture a color display by making use of conductive phosphors.

On the other hand, there has been studied to employ a phosphor material consisting a mixture comprising a phosphor and a conductive material. For example, there has been proposed to employ a phosphor and $In_2O_3$. However, since a mixing ratio of the phosphor is lowered in such a phosphor material, the luminous efficiency is inevitably deteriorated.

Further, a phosphor material comprising ZnS:Ag,Cl covered with a conductive layer consisting of $In_2O_3$ prepared by sol-gel method is disclosed in a document, "Extended Abstracts of the 2nd International Conference on the Science and Technology of Display Phosphors, Nov. 18 (1996), p.319. However, it is assumed that a phosphor particle employed in this method is of nearly polyhedron in shape, which is synthesized by ordinary flux method. Accordingly, even if the phosphor particle is covered with an $In_2O_3$ conductive layer, the polyhedron shape would be still maintained. When a phosphor layer is formed by making use of such a polyhedral phosphor material, it is difficult to form a phosphor layer of high density due to the poor packing property of the polyhedral phosphor material, thus making it disadvantageous in terms of luminance. Furthermore, a high electric field may be applied to the projected portions of the rough fluorescent screen, thus making it difficult to obtain a uniform emission.

BRIEF SUMMARY OF THE INVENTION

Accordingly, an object of the present invention is to provide a phosphor material which is suited for use in a low voltage electron beam excited display and capable of effectively preventing the phosphor screen from being charged up.

Another method of this invention is to provide a method of easily manufacturing such a phosphor material.

Still another method of this invention is to provide a display device having a phosphor layer comprising the aforementioned phosphor material and being capable of exhibiting an excellent display property.

This invention provides a phosphor material comprising;

a phosphor particle; and a conductive layer formed on the surface of the phosphor particle;

wherein the ratio between the minor axis and the major axis of the phosphor material is 1.5 or less.

This invention provides a method of manufacturing a phosphor material comprises the steps of;

generating thermal plasma;

supplying a conductive material into the thermal plasma so as to evaporate the conductive material;

supplying phosphor particles into the thermal plasma so as to allow the conductive material to adhere onto the surface of the phosphor particles; and cooling the phosphor particles having the conductive material adhered thereon.

This invention provides a display device comprising;

a fluorescent screen provided with an anode and a phosphor layer formed on the anode; and a cathode emitting an electron beam for exciting the phosphor layer;

wherein a phosphor material constituting the phosphor layer comprises a phosphor particle; and a conductive layer formed on the surface of the phosphor particle; the ratio between the minor axis and the major axis of the phosphor material being 1.5 or less.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
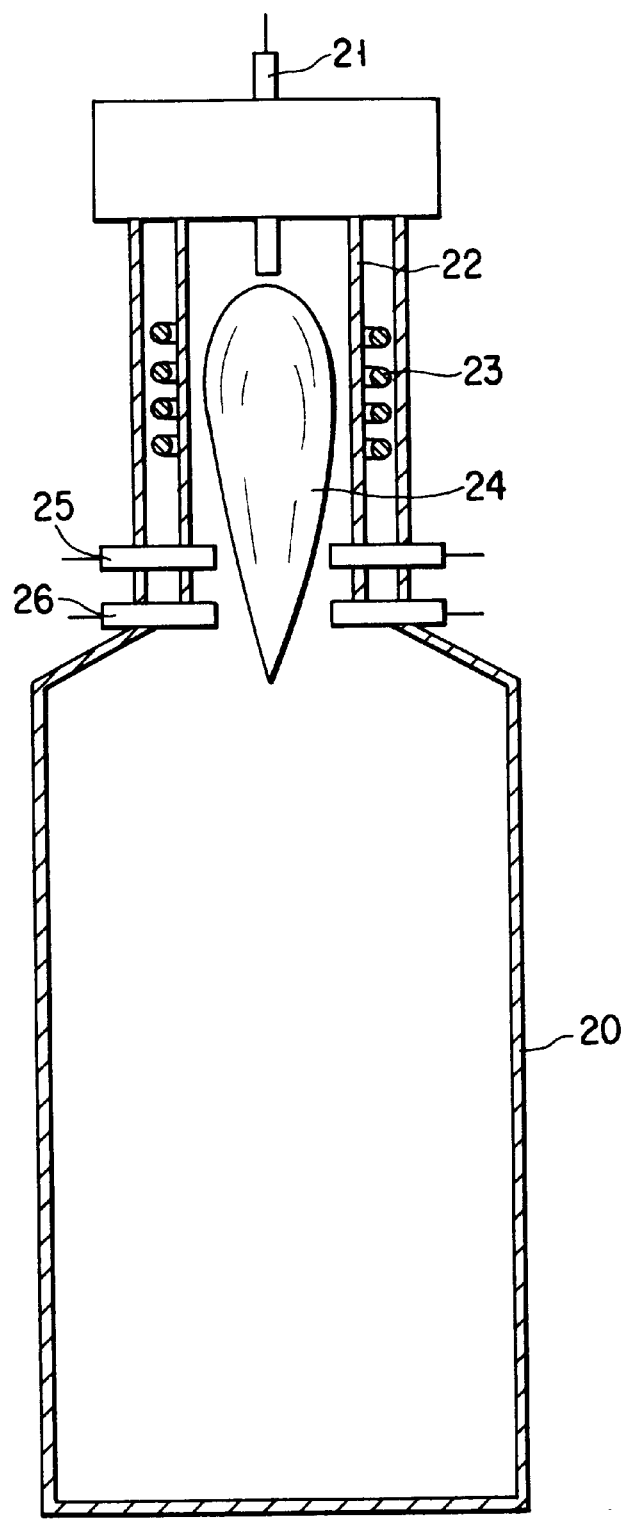
FIG. 1 is a sectional view of a thermal plasma apparatus for manufacturing a phosphor material according to this invention.

The phosphor material according to this invention comprises a phosphor particle, and a conductive layer formed on the surface of the phosphor particle, wherein the ratio between the minor axis and the major axis of the phosphor particle is 1.5 or less.

This phosphor material can be manufactured by means of a thermal plasma as explained in detail hereinafter.

As for the phosphor particle constituting the core of the phosphor material, any kind of phosphor known conventionally can be employed. The phosphor to be employed should preferably be selected from those which are capable of emitting light in high efficiency by an electron beam excitation. Further, the phosphor to be employed should preferably be selected from those at least the surface of which can be melted when exposed to thermal plasma of several thousands degrees centigrade without being sublimated, evaporated or decomposed, and which can hardly react with a conductive material.

Preferable examples of such a phosphor are a rare earth oxide phosphor such as $Y_2O_3$:Eu; a rare earth oxysulfide phosphor such as $Gd_2O_2S$:Pr or $Y_2O_2S$:Tm; a garnet-based phosphor such as $Y_3Al_5O_{12}$:Tb; and a rare earth silicate-based phosphor such as $Y_2SiO_5$:Ce.

The average particle size of the phosphor particle should preferably be in the range of from 0.1 to 5 $\mu$m. This average particle size can be determined by Braine method or by statistical method through an electron microscopic observation. If the average particle size of the phosphor particle is less than 0.1 $\mu$m, the crystallinity of the phosphor particle would become poor, so that the emission efficiency of the phosphor particle would probably be deteriorated. On the other hand, if the phosphor particle having an average particle size of more than 5 $\mu$m is employed for forming a phosphor layer, the surface of the resultant fluorescent screen would become rough. As a result, when the electron beam source (cathode) is disposed close to the fluorescent screen as in the case of the field emission display, the electric field intensity becomes ununiform, thus giving rise to ununiformity in brightness.

The phosphor particle should preferably be spherical in shape, i.e., 1.5 or less in the ratio between the major axis and the minor axis thereof. When the phosphor particle is spherical in shape, the specific surface area of the phosphor particle is decreased, so that the scattering of light at the surface of the phasphor particles or at the interface between the phosphor particle and the conductive layer can be minimized. As a result, emission can be effectively taken out of the phosphor particle and hence the apparent luminous efficiency can be enhanced. Furthermore, if the phosphor particle is spherical in shape so that the roughness of the phosphor layer is minimized, the generation of discharging or bright point due to a concentration of electric field can be suppressed.

As for the material for the conductive layer to be formed on the surface of the phosphor particle, there is not any particular limitation, i.e., any inorganic material such as indium oxide, indium-tin oxide, tin oxide, zinc oxide, zinc chalcongenide, gallium nitride, indium nitride and CdTe can be employed. The conductive material should preferably be selected from those which are high in transmittance of an electron beam to be employed for exciting the phosphor, thus the average atomic weight of the elements constituting the conductive material should preferably be 70 or less. Furthermore, the electric resistance of the conductive material may be as low as $10^4$ $\Omega$ cm or less, more preferably $10^2$ $\Omega$ cm or less.

The conductive material should preferably be selected from those which can be evaporated when exposed to thermal plasma of several thousands degrees centigrade. Because, if such a conductive material is selected, it is possible to form a uniform thin conductive layer on the surface of the phosphor particle by making use of a thermal plasma process, thus making it possible to maintain the ratio between the minor axis and major axis of the phosphor particle within the aforementioned range.

The thickness of the conductive layer to be formed on the surface of the phosphor particle should preferably be 10% or less of the particle size of the phosphor particle. If the thickness of the conductive layer exceeds 10% of the particle size of the phosphor particle, the absorption of electron beam may be increased thereby to deteriorate the luminous efficiency of the phosphor. However, the thickness of the conductive layer should preferably be 5 nm or more. Namely, if the thickness of the conductive layer is less than 5 nm, the electric resistance of the conductive layer may be increased, thus the layer becomes incapable of functioning as a conductive layer.

The phosphor material comprising a phosphor particle covered with a thin uniform conductive layer, has the ratio between the minor axis and the major axis of 1.5 or less, and is capable of allowing electric charges to be removed effectively through the conductive layer even when the phosphor material is excited by means of a low voltage electron beam. Namely, the fluorescent screen is constituted by a large number of particles of phosphor material and the conductive layers formed on the surfaces of the phosphor particles are in contact with each other. Thus, the fluorescent screen can be made entirely conductive, so that the quantity of conductive material can be extremely minimized. Therefore, it is possible to inhibit any deterioration of luminous efficiency resulting from charge-up while limiting absorption of electron beam by the conductive layer to a minimum. Furthermore, since the phosphor particle is covered by an inorganic material, the chemical deterioration of the phosphor particle can also be inhibited.

According to the method of this invention, the conductive layer is formed on the surface of the phosphor particle by making use of thermal plasma. In the thermal plasma process, raw phosphor particles are supplied into thermal plasma heated to a temperature higher than the melting point of the phosphor and allowed to cause at least the surfaces thereof to melt while they are floating in the plasma. The phosphor particles are cooled when they fall from the thermal plasma. By making use of this method, a phosphor particle having a spherical shape can be obtained.

According to this invention, a conductive material is supplied into the thermal plasma so as to evaporate the conductive material, and then phosphor particles are supplied into the thermal plasma, thereby causing the surfaces of the phosphor particles to melt and at the same time causing the evaporated conductive material to adhere onto the surfaces of phosphor particles, the resultant phosphor particles being subsequently allowed to cool. By making use of this method, a phosphor particle having a spherical shape and being covered with a conductive material can be obtained.

In the manufacture of the phosphor material of this invention, employed is a high frequency induction type thermal plasma apparatus as shown in FIG. 1. Referring to FIG. 1, this thermal plasma apparatus comprises a thermal plasma chamber 20 provided at its upper portion with a gas inlet port 21 for supplying a plasma gas such as argon so as to allow the plasma gas to flow from top to bottom in the apparatus. A cylinder 22 is disposed below the gas inlet port 21 and a high frequency coil 23 is wound around the cylinder 22. A plasma flame 24 can be generated by supplying a plasma gas from the gas inlet port 21 and by applying a current to the high frequency coil 23. A supply nozzle 25 for a conductive material and a supply nozzle 26 for phosphor particles are arranged respectively at the locations of the apparatus which are suited for supplying the conductive material and phosphor particles into the plasma flame 24 to be generated.

In the operation of this thermal plasma apparatus, a plasma gas is first supplied from the gas inlet port 21 into the chamber 20 and a current is supplied to the high frequency coil 23 so as to allow a plasma flame 24 to be generated. Then, a conductive material is supplied together with a carrier gas (for example, argon) into the plasma flame 24 thereby allowing the conductive material to evaporate. Subsequently, raw phosphor particles are supplied together with a carrier gas (for example, argon) into the plasma flame 24 thereby allowing the raw phosphor particles to float in the plasma flame 24. While being floated in the plasma flame 24, at least the surfaces of the phosphor particles are caused to melt by the heat from the plasma and, due to the surface tension of this molten surface, the phosphor particles are made into spherical shape. At the same time, the evaporated conductive material is caused to adhere onto the surfaces of the spherical phosphor particles. The spherical phosphor particles are cooled while they fall out of the plasma flame 24, thus spherical phosphor particles coated with a conductive layer are obtained. The resultant phosphor particles are recovered with a collecting apparatus such as a cyclone (not shown).

As mentioned above, it is possible by making use of the thermal plasma process to manufacture a spherical phosphor material coated on its surface with a uniform thin conductive layer in a single step.

The raw phosphor particle to be employed in this method is constituted by a matrix and an activator which are the same as those of the aimed phosphor particle. However, the concentration of the activator in the raw phosphor particle may not be the same as that of the aimed phosphor particle. Further, when the matrix is formed of a mixed crystal, the ratio of components in the mixed crystal in the raw phosphor particle may not be the same as that of the aimed phosphor particle.

For the purpose of improving the luminous efficiency, it is preferable to subject the phosphor material obtained by the thermal plasma process to heat treatment at a temperature of 800 to 1,600° C.

The display device according to this invention is designed such that an anode having a phosphor layer and a cathode are disposed to face to each other, and that when a voltage of 1 kV or less is applied between these electrodes, the phosphor is excited to emit light by a low voltage electron emitted from the cathode, thus performing display. Typical examples of such a display device include a vacuum fluorescent display and a field emission display.

According to the display device of this invention, employed for constituting the phosphor layer is a phosphor material comprising a phosphor particle and a conductive layer formed on the surface of the phosphor particle, and having the ratio between the minor axis and the major axis of 1.5 or less.

This invention will be further explained with reference to a field emission display as an example of the display devices to which this invention is applicable.

Figure 2A:
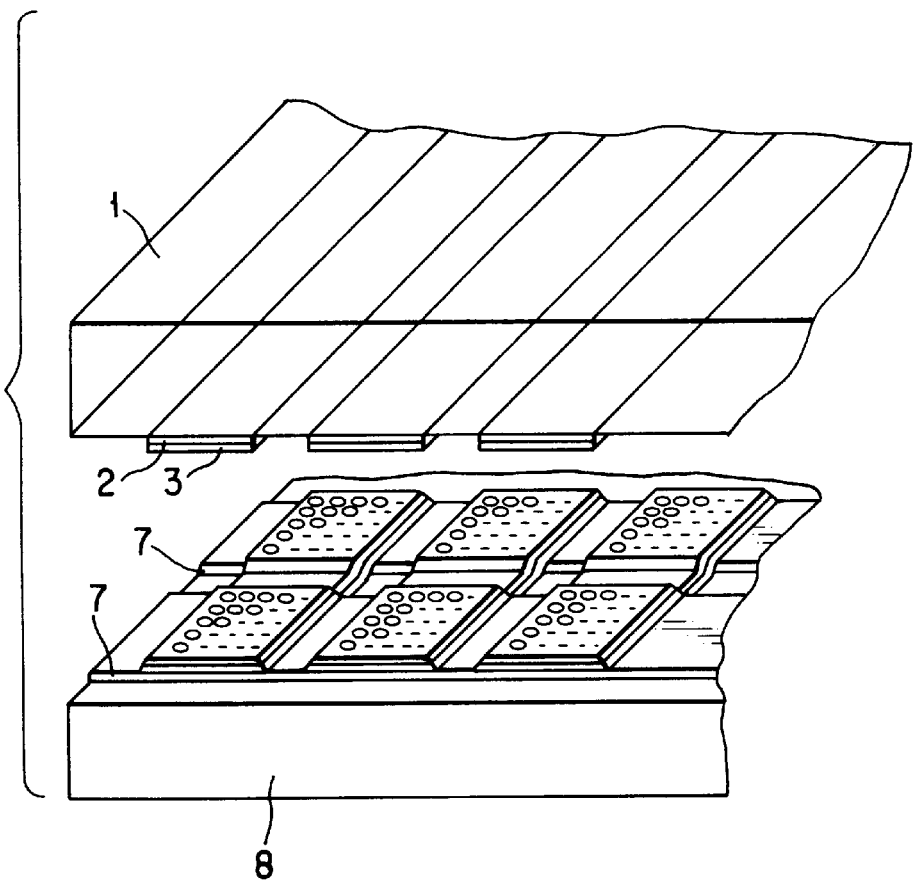
FIG. 2A is a perspective view of a field emission display according to this invention.
Figure 2B:
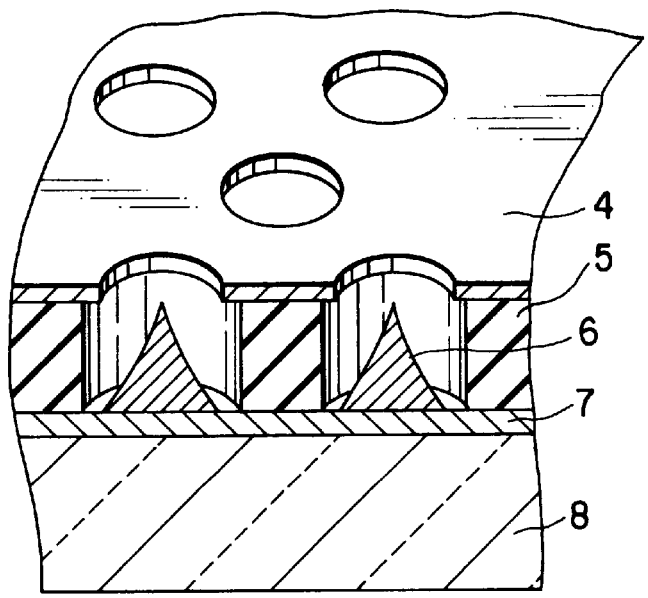
FIG. 2B is an enlarged sectional view showing a portion of the field emission display shown in FIG. 2A.

FIGS. 2A and 2B illustrate a main portion of a field emission display. As shown in FIG. 2A, a fluorescent screen comprising an anode 2 formed of a stripe-shaped conductive layer and a phosphor layer 3 is formed on the surface of the glass substrate 1. The phosphor layer 3 can be formed by making use of a phosphor material comprising a phosphor particle covered with a conductive layer and by coating this phosphor material by means of electrophoresis, a slurry coating method or a sedimentation method. The thickness of the phosphor layer 3 may be one to five times as thick as the size of the phosphor material. On the other hand, a glass substrate 8 disposed to face the glass substrate 1 is provided with a stripe-shaped conductor pattern 7 constituting the cathode, which extends in a perpendicular direction to the anode 2. FIG. 2B illustrates an enlarged view of a portion of the cathode shown in FIG. 2A. As shown in FIG. 2B, an a large number of cathodes 6 and an insulating layer 5, which separates the individual cathodes 6, are formed on the conductive pattern 7 so as to face the anode 2. These cathodes 6 are so-called Spindt-type cold cathode made of Mo, for example, formed into a cone shape. Further, a gate electrode 4 having a large number of openings, each disposed in conformity with each electrode 6, is formed on the insulating layer 5. By arranging these members in this manner, a cathode array is regularly formed. The cathode array is spaced apart from the fluorescent screen by a distance of 200 $\mu$m to 5 mm and the resultant space is vacuum-sealed.

A voltage is applied to the anode 2 to a positive potential of 1 kV or less in relative to the cathode 6, and a positive bias voltage is applied to the gate electrode 4 so as to cause a field emission. As a result, electrons are emitted from the cathode 6 and accelerated to reach the fluorescent screen, whereby the phosphor is excited. The phosphor thus excited is caused to emit light which can be seen through the anode 2 and the glass substrate 1.

Therefore, by arranging a conductor pattern of anode 2 side and a conductor pattern 7 of anode side so as to intersect to each other, and by applying the aforementioned voltage pulse to the electrodes of each side corresponding to a desired pixel it is possible to allow the desired pixel to emit light. By scanning each of the conductor patterns in this manner, a desired display can be obtained. Further, if a pattern of phosphor layers 3 capable of emitting red, green and blue light respectively is formed on the anode 2, it is possible obtain a color display.

The glass substrate 1 is required to be high in transmittance of visible light in view of allowing emission to pass through when the phosphor is excited. The anode 2 is formed of a transparent conductive film such as indium tin oxide (ITO) so as to allow emission from the phosphor to pass through. As for the counter substrate 8, it may not be formed of glass, but may be any kind of material as long as it has a required strength.

Since the phosphor layer is constituted by a spherical phosphor material comprising a phosphor particle whose surface is covered by a conductive layer according to the display device of this invention, a deterioration of luminous efficiency due to charge-up can be minimized.

EXAMPLES

Followings are explanation of this invention based on specific examples.

Example 1

A high frequency induction type thermal plasma apparatus as shown in FIG. 1 was employed to prepare a phosphor material as explained below. Zinc oxide (ZnO) powder was employed as a conductive material. $Y_2O_3$:Eu powder was employed as a raw phosphor. The average particle size of this $Y_2O_3$:Eu powder was found to be 0.5 μm as measured by means of Braine method.

Argon gas was supplied from the gas inlet port 21 at a flow rate of 10 L/min, and allowed to flow from the top to bottom of the apparatus. A high frequency power of 4 MHz and 15 kW was applied to the high frequency coil 23 which was disposed to surround the argon gas stream, thereby generating a plasma flame 24. Then, ZnO powder was fed from the upper nozzle 25 at a rate of 2 g/min together with an argon gas of 20 L/min in flow rate into the plasma flame 24 thereby allowing the ZnO powder to evaporate. Subsequently, the $Y_2O_3$:Eu powder was fed from the lower nozzle 26 at a rate of 5 g/min together with an argon gas of 30 L/min in flow rate into the plasma flame 24. This operation was continued for 30 minutes, and then the resultant phosphor particles collected in a cyclone (not shown) disposed at a downstream side of the thermal plasma chamber were recovered.

When the average particle size of the phosphor particles thus obtained was measured by means of Braine method, it was 0.8 μm, and the ratio between the major axis and the minor axis was found to be 1.1. When a sliced sample of the phosphor particles thus obtained was observed by means of a transmission electron microscope, the conductive layer formed on the surface of the phosphor particle was found to be uniformly about 50 nm in thickness.

Then, a field emission display was manufactured as follows by making use of the phosphor material obtained as mentioned above. A 2.5 cm glass substrate was coated with a transparent conductive layer made of ITO. This glass substrate was then placed on the bottom of a vessel. Then, an ethanol solution in which the phosphor material was dispersed was put into the vessel and the phosphor material was allowed to precipitate on the surface of the glass substrate thereby forming a phosphor layer of 1.5 mg/cm$^2$ in coating weight. On the other hand, a counter substrate having a structure as shown in FIG. 2B and provided with a Spindt-type cold cathode array made of Mo about 1 μm in height was prepared. These substrates were then faced to each other at a distance of 300 μm and vacuum-sealed whereby manufacturing a field emission display (Example 1).

For the purpose of comparison, another field emission display (Comparative Example 1) was manufactured in the same manner as described above except that the raw phosphor powder was employed to form a phosphor layer.

When a voltage of +450V was applied to the anode in relative to the cathode in each display of Example 1 and Comparative Example 1, red emission was observed. However, ununiformity in brightness and non-emission spots were observed in the display of Comparative Example 1. Furthermore, the brightness, fluctuated with time in the display of Comparative Example 1. Whereas, in the display according to Example 1, ununiformity in brightness was not observed and the emission was stable. When these displays were compared with each other with respect to an average luminance of the entire fluorescent screen, the display of Example 1 exhibited about 20 times as bright as that of Comparative Example 1.

Example 2

A phosphor material was prepared in the same manner as explained in Example 1 excepting that indium oxide ($In_2O_3$) powder was fed from the upper nozzle 25 at a rate of 3 g/min together with an argon gas of 20 L/min in flow rate into the plasma flame 24 thereby allowing the $In_2O_3$ powder to evaporate, and that the $Y_2O_2S$:Tm powder of 3.2 μm in average particle size was fed from the lower nozzle 26 at a rate of 5 g/min together with an argon gas of 30 L/min in flow rate into the plasma flame 24.

When the average particle size of the phosphor particles thus obtained was measured, it was 3.5 μm, and the conductive layer formed on the surface of the phosphor particle was found to be uniformly about 30 nm in thickness.

Then, a field emission display was manufactured in the same manner as Example 1 except that the phosphor material obtained above was employed to form a phosphor layer of 3.0 mg/cm$^2$ in coating weight on the surface of the glass substrate (Example 2).

For the purpose of comparison, another field emission display (Comparative Example 2) was manufactured in the same manner as described above except that the raw phosphor powder was employed to form a phosphor layer.

When a voltage of +450V was applied to the anode in relative to the cathode in each display of Example 2 and Comparative Example 2, blue emission was observed. However, ununiformity in brightness and non-emission spots were observed with naked-eye in the display of Comparative Example 2. Furthermore, the brightness fluctuated with time in the display of Comparative Example 2. Whereas, in the display according to Example 2, ununiformity in brightness was not observed and the emission was stable. When these displays were compared with each other with respect to an average luminance of the entire fluorescent screen, the display of Example 2 exhibited about 8 times as bright as that of Comparative Example 2.

Example 3

A phosphor material was prepared in the same manner as explained in Example 1 excepting that gallium nitride (GaN) powder was fed from the upper nozzle 25 at a rate of 3 g/min together with a mixed gas consisting of 15 vol % $N_2$-85 vol % Ar of 20 L/min in flow rate into the plasma flame 24 thereby allowing the GaN powder to evaporate, and that the $Y_3Al_5O_{12}$:Tb powder of 3.7 μm in average particle size was fed from the lower nozzle 26 at a rate of 10 g/min together with an argon gas of 30 L/min in flow rate into the plasma flame 24. When the average particle size of the phosphor particles thus obtained was measured, it was 4.5 μm, and the conductive layer formed on the surface of the phosphor particle was found to be uniformly about 80 nm in thickness.

Then, a field emission display was manufactured in the same manner as Example 1 except that the phosphor material obtained above was employed to form a phosphor layer of 5.0 mg/cm$^2$ in coating weight on the surface of the glass substrate (Example 3).

For the purpose of comparison, another field emission display (Comparative Example 3) was manufactured in the same manner as described above except that the raw phosphor powder was employed to form a phosphor layer.

When a voltage of +450V was applied to the anode in relative to the cathode in each display of Example 3 and Comparative Example 3, green emission was observed. However, ununiformity in brightness and non-emission spots were observed with naked-eye in the display of Comparative Example 3. Furthermore, the brightness fluctuated with time in the display of Comparative Example 3. Whereas, in the display according to Example 3, any prominent ununiformity in brightness was not recognized and the emission was stable. When these displays were compared with each other with respect to an average luminance of the entire fluorescent screen, the display of Example 3 exhibited about 30 times as bright as that of Comparative Example 3.

Examples 4 to 6

A phosphor materials were prepared in the same manner as explained in Example 1 except that the phosphor particles and conductive materials shown in the following Table 1 were employed. Table 1 shows the particle size of the resultant phosphor material and the thickness of the conductive layer in each of Examples 4 to 6.

Then, a field emission display of each Example was manufactured in the same manner as Example 1 except that the phosphor material obtained was employed to form a phosphor layer of predetermined coating weight.

Then, an average luminance of the entire. fluorescent screen of each display was measured, the results being summarized in Table 1. $L/L_0$ shown in Table 1 indicates a ratio between the luminance L of the display which was manufactured by making use of a phosphor material of this invention comprising a phosphor particle covered with a conductive layer and the luminance $L_0$ of the display which was manufactured by making use of a raw phosphor powder.

As apparent from Table 1, the displays which were manufactured by making use of the phosphor materials according to this invention all indicated an excellent luminance.

TABLE 1

| | Phosphor | Conductive material | Particle size of phosphor material (μm) | Thickness of conductive layer (nm) | Coating weight (mg/cm$^2$) | $L/L_0$ |
|---|---|---|---|---|---|---|
| Example 4 | $Gd_2O_3$:Eu | GaN | 2.5 | 40 | 2 | 15 |
| Example 5 | $Y_2SiO_5$:Ce | GaN | 4.5 | 40 | 3 | 15 |
| Example 6 | $Y_2O_2$S:Tm | ZnO | 4.7 | 50 | 3 | 5 |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A phosphor material comprising:

a phosphor particle; and a conductive layer formed on the surface of the phosphor particle;

wherein the ratio between the minor axis and the major axis of said phosphor material is 1.5 or less, wherein the electric resistivity of said conductive layer is 10$^4$ cm or less.

2. The phosphor material according to claim 1, wherein the average particle size of said phosphor particle is in the range of 0.1 to 5 μm.

3. The phosphor material according to claim 1, wherein the thickness of said conductive layer is 10% or less of the particle size of said phosphor particle.

4. The phosphor material according to claim 1, wherein the thickness of said conductive layer is 5 nm or more.

5. The phosphor material according to claim 1, wherein said conductive layer is selected from the group consisting of indium oxide, indium tin oxide, tin oxide, zinc oxide, zinc chalcongenide, gallium nitride and indium nitride.

6. The phosphor material according to claim 1, wherein the electric resistivity of said conductive layer is 10$^2$ Ω cm or less.

7. A method of manufacturing a phosphor material comprising the steps of;

generating thermal plasma;

supplying a conductive material into said thermal plasma so as to evaporate the conductive material;

supplying phosphor particles into said thermal plasma so as to allow said conductive material to adhere onto the surface of said phosphor particles; and cooling said phosphor particles having said conductive material adhered thereon.

8. The method according to claim 7, further comprising a step of subjecting obtained phosphor particles to heat treatment at a temperature of 800 to 1600° C.

9. A display device comprising:

a fluorescent screen provided with an anode and a phosphor layer formed on said anode; and a cathode emitting an electron beam for exciting said phosphor layer;

wherein a phosphor material constituting said phosphor layer comprises a phosphor particle, and a conductive layer formed on the surface of the phosphor particle, and wherein a ratio between the minor axis and the major axis of said phosphor material is 1.5 or less, and wherein the electric resistivity of said conductive layer is 10$^4$ Ω cm or less.

10. The display device according to claim 9, wherein said phosphor layer is excited with a low voltage electron beam which is accelerated with an anode voltage of 1 kV or less.

11. The display device according to claim 10, wherein said display device is used as a field emission display.

12. The display device according to claim 9, wherein the average particle size of said phosphor particle is in the range of 0.1 to 5 μm.

13. The display device according to claim 9, wherein the thickness of said conductive layer is 10% or less of the particle size of said phosphor particle.

14. The display device according to claim 9, wherein the thickness of said conductive layer is 5 nm or more.

15. The display device according to claim 9, wherein said conductive layer is selected from the group consisting of indium oxide, indium tin oxide, tin oxide, zinc oxide, zinc chalcongenide, gallium nitride and indium nitride.

16. The display device according to claim 9, wherein the electric resistivity of said conductive layer is $10^2$ $\Omega$ cm or less.

* * * * *